US010024953B2

(12) United States Patent
Johnson et al.

(10) Patent No.: US 10,024,953 B2
(45) Date of Patent: Jul. 17, 2018

(54) RADAR SYSTEM PROVIDING MULTIPLE WAVEFORMS FOR LONG RANGE AND SHORT RANGE TARGET DETECTION

(71) Applicant: FLIR Systems, Inc., Wilsonville, OR (US)

(72) Inventors: Stuart Johnson, Hampshire (GB); Richard Jales, Hampshire (GB); Stuart Mudge, Hampshire (GB); Larry Yeomans, Hampshire (GB); Chris Freeman, Hampshire (GB); Stewart Lawton, Hampshire (GB); Steve Tostevin, Hampshire (GB)

(73) Assignee: FLIR Systems, Inc., Wilsonville, OR (US)

(*) Notice: Subject to any disclaimer, the term of this patent is extended or adjusted under 35 U.S.C. 154(b) by 79 days.

(21) Appl. No.: 15/482,554

(22) Filed: Apr. 7, 2017

(65) Prior Publication Data

US 2017/0315209 A1 Nov. 2, 2017

Related U.S. Application Data

(63) Continuation of application No. 13/724,439, filed on Dec. 21, 2012, now Pat. No. 9,618,605.

(Continued)

(51) Int. Cl.
*G01S 13/93* (2006.01)
*G01S 7/02* (2006.01)
(Continued)

(52) U.S. Cl.
CPC .............. *G01S 7/02* (2013.01); *G01S 7/03* (2013.01); *G01S 7/032* (2013.01); *G01S 7/35* (2013.01);
(Continued)

(58) Field of Classification Search
CPC ....... G01S 13/582; G01S 13/87; G01S 13/282
(Continued)

(56) References Cited

U.S. PATENT DOCUMENTS 2,842,759 A 7/1958 Kenyon
3,146,442 A 8/1964 Hansford et al.
(Continued)

FOREIGN PATENT DOCUMENTS

CN 1976118 6/2007
CN 101153911 4/2008
WO WO 2009/140032 11/2009

OTHER PUBLICATIONS

Rivenq-Menhaj et al. "Combining two radar techniques to implement a collision avoidance system", Measurement Science and Technology, IOP, Aug. 1, 1998, pp. 1343-1346, vol. 9, No. 8, Bristol, GB.

(Continued)

*Primary Examiner* — Marcus E Windrich
(74) *Attorney, Agent, or Firm* — Haynes and Boone, LLP

(57) ABSTRACT

Various techniques are disclosed for providing a radar system. In one example, such a radar system includes a radar unit adapted to broadcast radar signals and receive return signals in response thereto. The radar unit includes a waveform generator adapted to provide pulse waveforms of different pulse widths and Frequency Modulated Continuous Wave (FMCW) waveforms, wherein the waveforms are interleaved with each other to provide a transmission sequence for the radar signals for detection of long range and short range targets, a power amplifier adapted to amplify the radar signals for broadcast, and an antenna adapted to broadcast the radar signals and receive the return signals. Other examples of radar systems and related methods are also provided.

20 Claims, 11 Drawing Sheets

Related U.S. Application Data

(60) Provisional application No. 61/581,989, filed on Dec. 30, 2011.

(51) Int. Cl.

| | | |
|---|---|---|
| *G01S 7/03* | (2006.01) | |
| *G01S 13/10* | (2006.01) | |
| *G01S 13/34* | (2006.01) | |
| *G01S 13/87* | (2006.01) | |
| *G01S 7/35* | (2006.01) | |
| *G01S 13/02* | (2006.01) | |
| *G01S 13/04* | (2006.01) | |
| *G01S 13/58* | (2006.01) | |

(52) U.S. Cl.
 CPC .......... *G01S 13/0209* (2013.01); *G01S 13/04* (2013.01); *G01S 13/10* (2013.01); *G01S 13/34* (2013.01); *G01S 13/583* (2013.01); *G01S 13/87* (2013.01); *G01S 2007/027* (2013.01)

(58) Field of Classification Search
 USPC .......................................................... 342/70
 See application file for complete search history.

(56) References Cited

U.S. PATENT DOCUMENTS

| | | | |
|---|---|---|---|
| 3,713,164 A | 1/1973 | Foury | |
| 4,158,840 A | 6/1979 | Schwab | |
| 5,034,747 A * | 7/1991 | Donahue | A42B 3/0433 2/410 |
| 5,453,753 A | 9/1995 | Cosenza et al. | |
| 5,517,197 A | 5/1996 | Algeo et al. | |
| 6,339,394 B1 * | 1/2002 | Cantrell | G01S 7/288 342/134 |
| 6,462,696 B1 | 10/2002 | Gorman | |
| 6,553,212 B1 * | 4/2003 | Wey | H03G 3/3047 376/318 |
| 6,690,316 B2 | 2/2004 | Yankielun | |
| 6,972,711 B2 | 12/2005 | Shono | |
| 7,053,816 B2 | 5/2006 | Kai | |
| 7,148,840 B2 | 12/2006 | Dooi et al. | |
| 7,170,440 B1 | 1/2007 | Beckner | |
| 7,339,540 B2 | 3/2008 | Tietjen | |
| 7,391,362 B2 | 6/2008 | Beckner | |
| 7,492,313 B1 | 2/2009 | Ehret et al. | |
| 7,508,267 B1 * | 3/2009 | Yu | H03F 3/195 330/286 |
| 7,924,170 B1 | 4/2011 | Arnold et al. | |
| 7,936,210 B2 | 5/2011 | Robinson et al. | |
| 8,442,016 B1 | 5/2013 | Lee et al. | |
| 2004/0004567 A1 * | 1/2004 | Kroeger | G01S 13/22 342/109 |
| 2005/0168377 A1 * | 8/2005 | Kai | G01S 7/4008 342/70 |
| 2005/0285773 A1 * | 12/2005 | Hartzstein | G01S 7/032 342/70 |
| 2006/0012511 A1 * | 1/2006 | Dooi | G01S 7/02 342/70 |
| 2010/0245162 A1 | 9/2010 | Krikorian et al. | |
| 2010/0295721 A1 * | 11/2010 | Focke | G01S 13/10 342/70 |
| 2011/0175765 A1 | 7/2011 | Chekroun et al. | |
| 2011/0187579 A1 * | 8/2011 | Asada | G01S 13/30 342/27 |
| 2013/0141270 A1 * | 6/2013 | Rodenbeck | G01S 13/0209 342/137 |
| 2013/0156089 A1 * | 6/2013 | Hezar | H04L 1/0071 375/238 |

OTHER PUBLICATIONS

Johnson et al. "Radar System and Related Mothods", U.S. Appl. No. 13/724,572, filed Dec. 21, 2012, 48 pages.
Bradford, J.H., McNamara, J.P., Bowden, W. and Gooseff, M.N. (2005), "Measuring thaw depth beneath peat-lined arctic streams using ground-penetrating radar", Hydrological Processes, vol. 19, Issue 14: pp. 2689-2699. Apr. 2009. DOI: 10.1002/Hyp.5781.
Sambuelli et al. "Study of riverine deposits using electromagnetic methods at a low induction number", Geophysics, vol. 72, No. 5. pp. B113-B120. Sep. 2007. DOI: 10.1190/1.2754249.
Aichele, David. "Next-Generation, GaN-based Power Amplifiers for Radar Applications". MPdigest.com article. Jan. 2009. Accessed Jan. 18, 2016. http://www.rfmw.com/data/RFMD_Aichele_GaNPAs_Jan09_MPD.pdf.
Joosting, Jean-Pierre. "Circulator ensures efficient heat dispersion and flexible board layout in WiMAX basestations". EEtimes.com article. Nov. 22, 2007. Accessed Jan. 18, 2016. http://www.eetimes.com/document.asp?doc_id=1224199.

* cited by examiner

RADAR SYSTEM PROVIDING MULTIPLE WAVEFORMS FOR LONG RANGE AND SHORT RANGE TARGET DETECTION

CROSS-REFERENCE TO RELATED APPLICATIONS

This application is a continuation of U.S. patent application Ser. No. 13/724,439 filed Dec. 21, 2012 and entitled "RADAR SYSTEM PROVIDING MULTIPLE WAVEFORMS FOR LONG RANGE AND SHORT RANGE TARGET DETECTION", which claims the benefit of U.S. Provisional Patent Application No. 61/581,989 filed Dec. 30, 2011 and entitled "RADAR SYSTEM PROVIDING MULTIPLE WAVEFORMS FOR LONG RANGE AND SHORT RANGE TARGET DETECTION", all of which are hereby incorporated by reference in their entirety.

TECHNICAL FIELD

One or more embodiments of the invention relate generally to radar systems and more particularly, for example, to solid state radar technology.

BACKGROUND

Radar systems are commonly used to detect targets (e.g., objects, geographic features, or other types of targets) in proximity to watercraft, aircraft, vehicles, or fixed locations. Conventional radar systems typically employ magnetrons to generate radar signals. Unfortunately, magnetrons and their related microwave hardware architecture are often expensive, physically cumbersome, and require large power supplies to operate. As a result, magnetron-based radar systems may not be well suited for use in compact or portable radar systems.

Certain radar systems employ rotary joints with one or more waveguides provided therein to direct signals between a rotating radar antenna and other components. However, such rotary joints are often complicated to design, build, and manufacture. As a result, these components can significantly increase the cost of their associated radar systems. In addition, conventional rotary joints may exhibit rotational noise that is unintentionally detected by the radar system.

Many existing radar systems use signaling schemes that generally benefit short range or long range target detection, to the detriment of the other. For example, pulsed radar signaling schemes may provide desirable target detection at long ranges. However, the transmitted pulsed radar signal may obscure the detection of short range return signals. Such problems are not preferred, but are often tolerated in pulsed radar signaling schemes because other long range detection techniques generally have higher power requirements and may require highly specified components. Conversely, Frequency Modulated Continuous Wave (FMCW) signaling schemes may provide desirable short range target detection, but may not be as effective at providing long range target detection.

Various radar systems may be implemented with Mini Automatic Radar Plotting Aid (MARPA) features in which detected targets may be selected for tracking. However, existing MARPA implementations are often hampered by inaccurate target identification. In particular, such implementations may incorrectly identify sea clutter as trackable targets and thus may reduce the accuracy of associated radar systems.

SUMMARY

Various techniques are disclosed for providing a radar system. For example, in certain embodiments, such a radar system may be implemented in a cost efficient manner and with a high degree of functionality.

In one embodiment, a radar system may be implemented with a Gallium Nitride (GaN) power amplifier to amplify radar signals for broadcast. Such an amplifier may be used, for example, in place of a magnetron to permit the radar system to be implemented with a compact form factor and relatively low power draw. In another embodiment, a Gallium Arsenide (GaAs) power amplifier may be used. Other amplifier implementations may be used in various embodiments where appropriate.

In another embodiment, a radar system may be implemented with a wireless transmitter to provide radar data from a rotating antenna to a base station. Such a wireless transmitter may be used, for example, to provide radar data without requiring a complicated rotary joint to pass detected signals.

In another embodiment, a radar system may be implemented with a signaling scheme configured to perform pulsed and FMCW signaling in a single radar system. Such a signaling scheme, for example, may be used to perform both short range and long range detection using a single radar system.

In another embodiment, a radar system may be implemented to perform Doppler processing on radar return signals to determine velocities of detected targets. Such processing, for example, may be used to provide accurate and reliable vessel target tracking, sea clutter recognition, and assistance in target identification.

In another embodiment, a radar system includes a radar unit adapted to broadcast radar signals and receive return signals in response thereto, the radar unit comprising: a waveform generator adapted to provide pulse waveforms of different pulse widths and Frequency Modulated Continuous Wave (FMCW) waveforms, wherein the waveforms are interleaved with each other to provide a transmission sequence for the radar signals for detection of long range and short range targets; a power amplifier adapted to amplify the radar signals for broadcast; and an antenna adapted to broadcast the radar signals and receive the return signals.

In another embodiment, a method of operating a radar system includes generating radar signals using a waveform generator to provide pulse waveforms of different pulse widths and Frequency Modulated Continuous Wave (FMCW) waveforms, wherein the waveforms are interleaved with each other to provide a transmission sequence for the radar signals for detection of long range and short range targets; amplifying the radar signals for broadcast using a power amplifier; broadcasting the radar signals using an antenna; receiving return signals at the antenna in response to the radar signals; and wherein the waveform generator, the power amplifier, and the antenna are part of a radar unit.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

Figure 1:
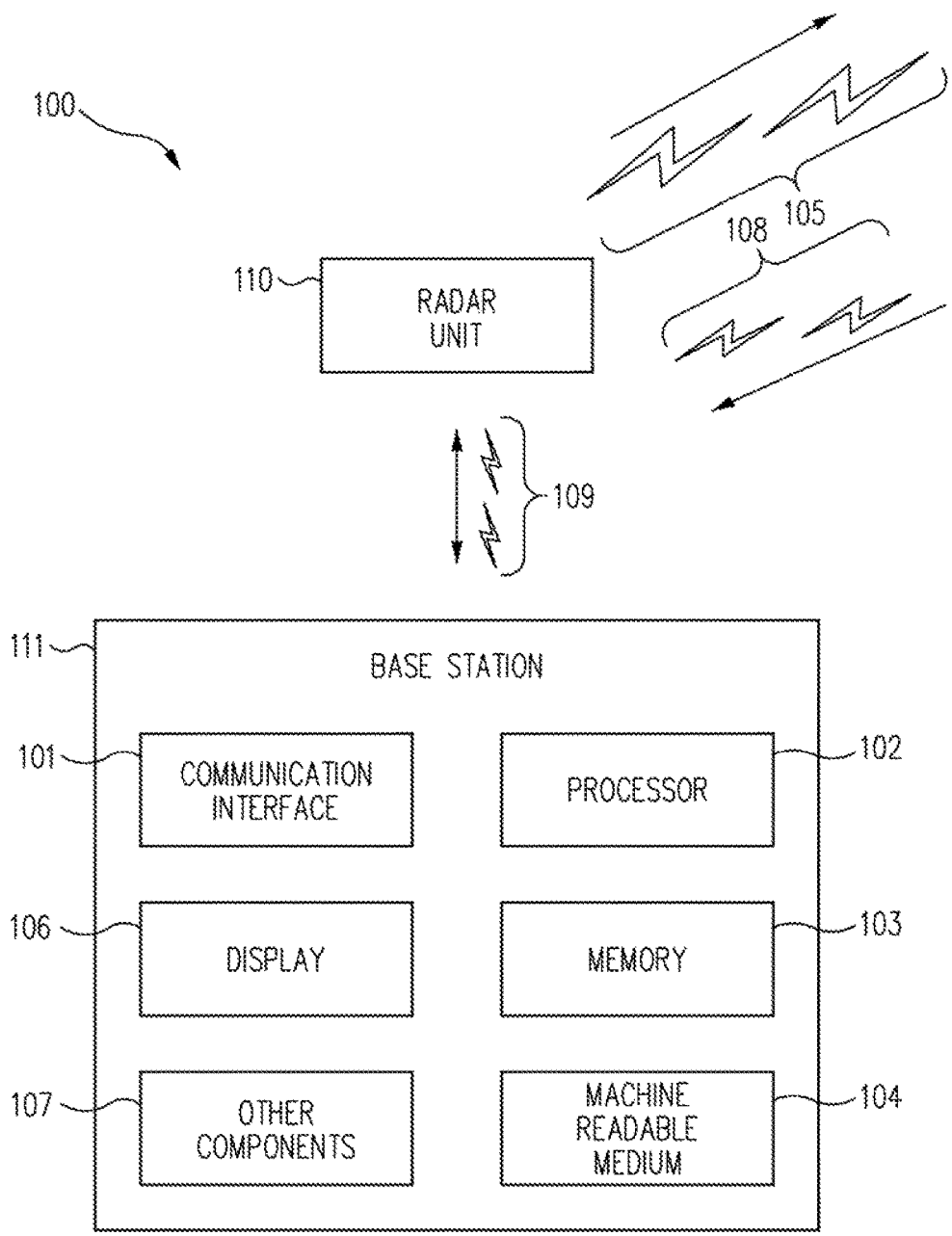
FIG. 1 illustrates a block diagram of a radar system including a radar unit and a base station in accordance with an embodiment of the disclosure.

FIG. 1 illustrates a block diagram of a radar system 100 including a radar unit 110 and a base station 111 in accordance with an embodiment of the disclosure. In various embodiments, radar system 100 may be configured for use on watercraft, aircraft, vehicles, fixed locations, or other environments, and may be used for various applications such as, for example, leisure navigation, commercial navigation, military navigation, other types of navigation, or other applications. In one embodiment, radar unit 110 may be implemented as a relatively compact portable unit that may be conveniently installed by a user.

As further described herein, radar unit 110 may be implemented to broadcast radar signals 105 and receive reflected return signals 108 in response thereto. Radar unit 110 may be in wireless communication with base station 111 through wireless signals 109 to provide, for example, radar data to base station 111 corresponding to return signals 108. Such wireless communication may be implemented in accordance with various wireless technology including, for example, Wi-Fi™, Bluetooth™, or other standardized or proprietary wireless communication techniques.

Base station 111 may be used to receive, process, and display radar data received from radar unit 110. In one embodiment, base station 111 may be installed at a fixed location. In another embodiment, base station 111 may be a portable device, such as a personal electronic device (e.g., a cell phone, personal digital assistant, laptop computer, camera, or other device). In one embodiment, base station 111 may operate as a control unit to provide control signals to radar unit 110 through wireless signals 109 to control the operation of radar unit 110. Base station 111 includes a communication interface 101, a processor 102, a memory 103, a machine readable medium 104, a display 106, and other components 107.

Communication interface 101 may communicate with radar unit 110 through, for example, wireless signals 109 and/or wired signals (e.g., passed by Ethernet and/or other wired communication mediums). Processor 102 may be implemented as any appropriate processing device (e.g., microcontroller, processor, application specific integrated circuit (ASIC), logic device, field programmable gate array (FPGA), circuit, or other device) that may be used by base station 110 to execute appropriate instructions, such as non-transitory machine readable instructions (e.g., software) stored on machine readable medium 104 and loaded into memory 103. For example, processor 102 may be configured to receive, process, or otherwise manipulate radar data received by communication interface 101, store the results in memory 103, and provide the results to display 106 for presentation to a user.

Display 106 may be used to present radar data, images, or information received or processed by base station 111. For example, in one embodiment, display 106 may be viewable by a user of radar system 100. In one embodiment, display 106 may be a multifunction display with a touchscreen configured to receive user inputs to control base station 111.

Base station 111 may include various other components 107 that may be used to implement other features such as, for example, other user controls, communication with other devices, or other components. For example, in one embodiment, communication interface 101 may communicate with another device which may be implemented with some or all of the features of base station 111. Such communication may be performed through appropriate wired or wireless signals (e.g., Bluetooth™, or other standardized or proprietary wireless communication techniques). For example, base station 111 may be located at a first position (e.g., on a bridge of a watercraft in one embodiment) and may communicate with a personal electronic device (e.g., a cell phone in one embodiment) located at a second position (e.g., co-located with a user on another location on the watercraft). In this regard, the user's personal electronic device may receive radar data and/or other information from base station 111 and/or radar unit 110. As a result, a user may conveniently receive relevant information (e.g., radar images, alerts, or other information) even while not in proximity to base station 111.

In various embodiments, one or more components of base station 111 may be implemented in radar unit 110. In one embodiment, operations described herein as being performed by processor 102 may be performed by an appropriate processor and related components of radar unit 110, and vice versa.

Figure 2:
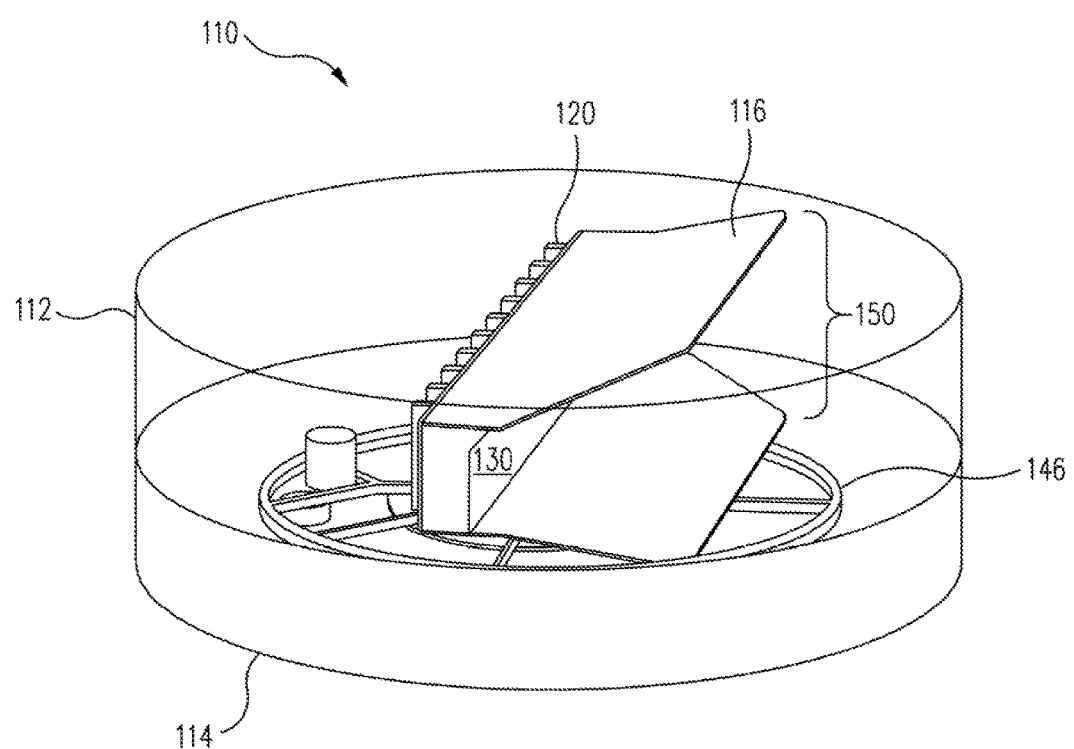
FIG. 2 illustrates a perspective view of a radar unit with a cover shown in semi-transparent form to reveal internal components in accordance with an embodiment of the disclosure.
Figure 3:
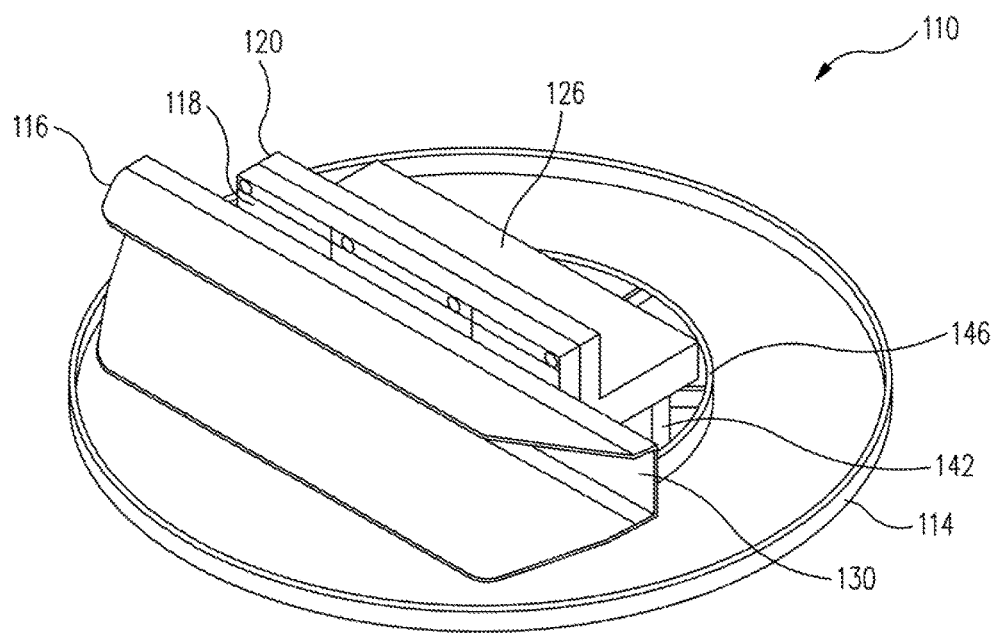
FIGS. 3 and 4 illustrate perspective views of a radar unit with a cover removed in accordance with embodiments of the disclosure.
Figure 4:
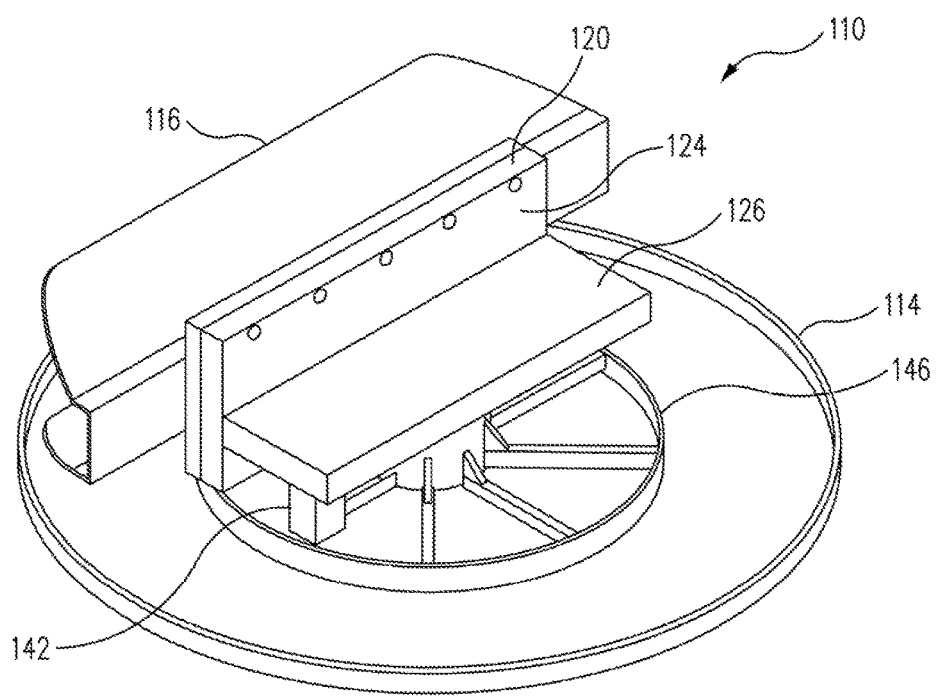
Figure 5:
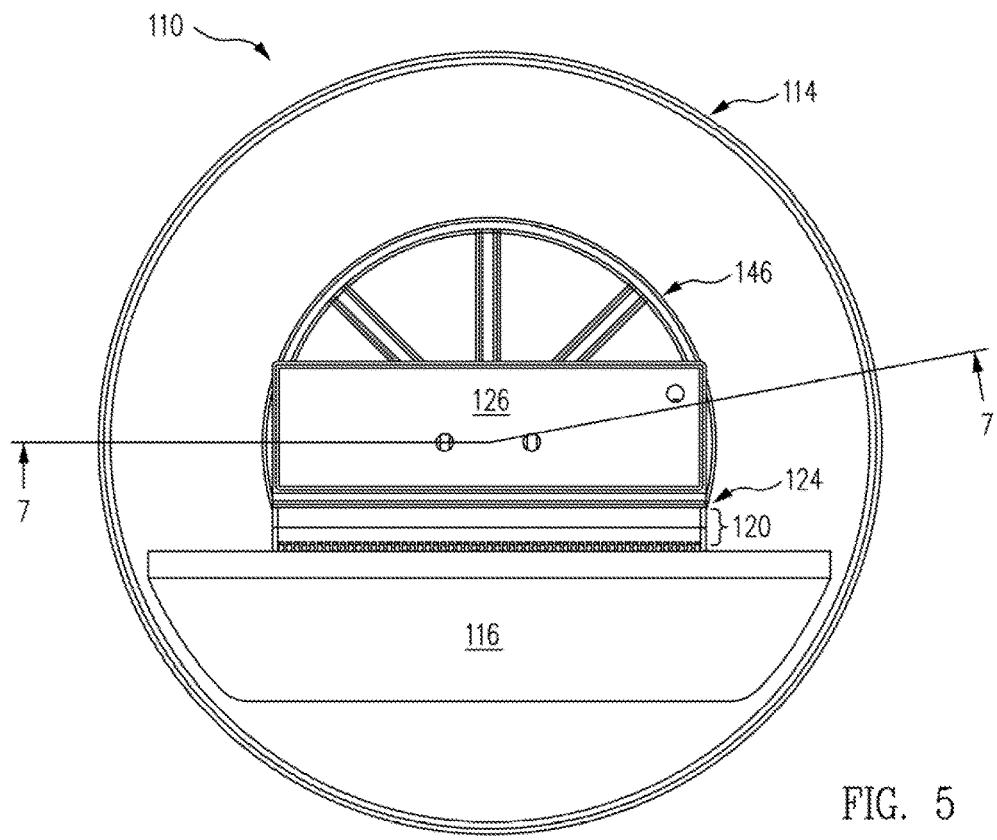
FIG. 5 illustrates a top view of a radar unit with a cover removed in accordance with an embodiment of the disclosure.
Figure 6:
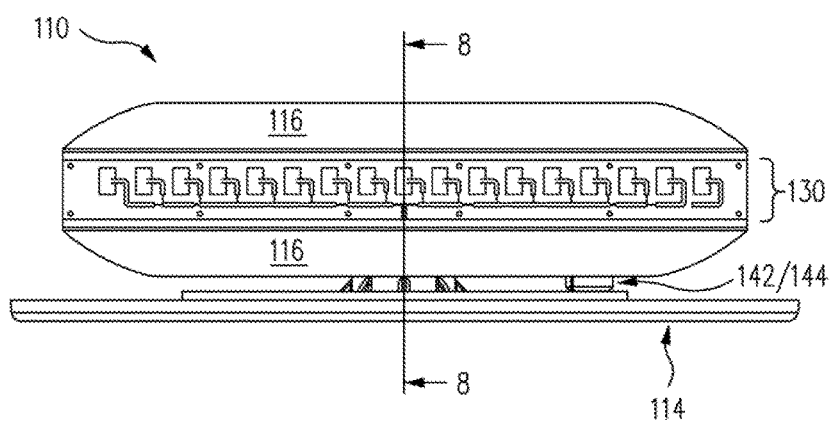
FIG. 6 illustrates a front view of a radar unit with a cover removed in accordance with an embodiment of the disclosure.
Figure 7:
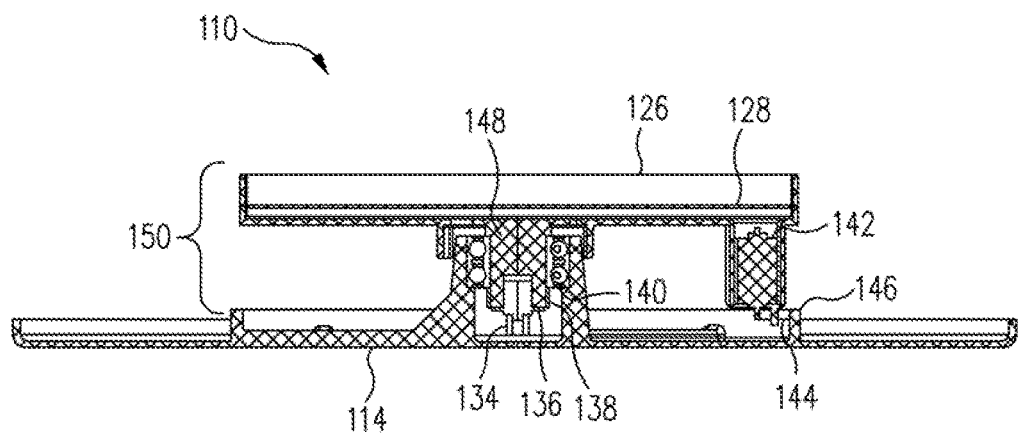
FIG. 7 illustrates a cross sectional view of a radar unit with a cover removed taken along lines 7-7 of FIG. 5 in accordance with an embodiment of the disclosure.
Figure 8:
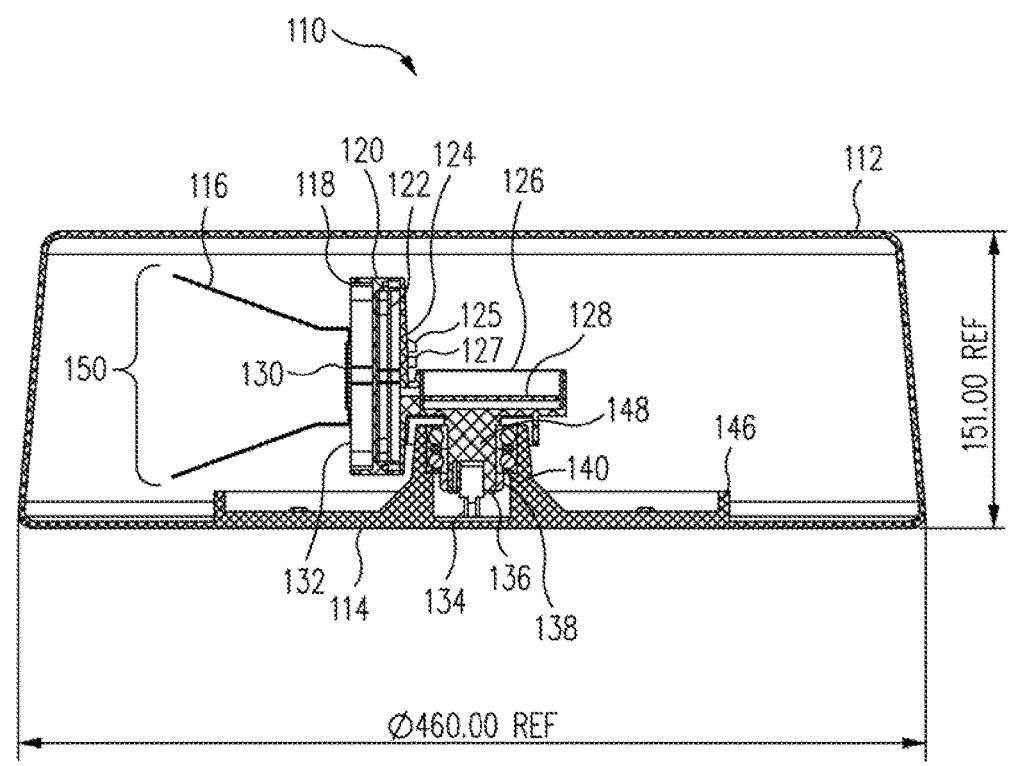
FIG. 8 illustrates a cross sectional view of a radar unit taken along lines 8-8 of FIG. 6 in accordance with an embodiment of the disclosure.

FIGS. 2-8 illustrate various views of radar unit 110. Specifically, FIG. 2 illustrates a perspective view of radar unit 110 with a cover 112 shown in semi-transparent form to reveal internal components in accordance with an embodiment of the disclosure. FIGS. 3 and 4 illustrate perspective views of radar unit 110 with cover 112 removed in accordance with embodiments of the disclosure. FIG. 5 illustrates a top view of radar unit 110 with cover 112 removed in accordance with an embodiment of the disclosure. FIG. 6 illustrates a front view of radar unit 110 with cover 112 removed in accordance with an embodiment of the disclosure. FIG. 7 illustrates a cross sectional view of radar unit 110 with cover 112 removed taken along lines 7-7 of FIG. 5 in accordance with an embodiment of the disclosure. FIG. 8 illustrates a cross sectional view of radar unit 110 taken along lines 8-8 of FIG. 6 in accordance with an embodiment of the disclosure.

Referring now to FIGS. 2-8, radar unit 110 includes a main assembly 150 mounted to a base 114 through a coupling 134 and enclosed by cover 112. In one embodiment, cover 112 and base 114 may be molded components.

Main assembly 150 includes a radar flare 116, a front plate 118, a heatsink 120, a receiver printed circuit board (PCB) 122, a receiver cover 124, a wireless interface 125 (e.g., a transmission interface), a power cover 126, a circulator 127, a power PCB 128, a patch antenna 130, a low noise converter PCB 132, slip rings 136, ball bearings 140, a motor 142 (e.g., an electric motor in one embodiment), a drive bush 144, and a main support 148.

Main assembly 150 may be configured to rotate relative to base 114. In this regard, drive bush 144 may contact or otherwise engage a track 146 of base 114 and motor 142. In one embodiment, track 146 may be a substantially circular track encircling an axis of rotation of main assembly 150 (e.g., the axis of rotation may correspond to coupling 134). In this regard, track 146 may be positioned near a perimeter (e.g., an outside edge) of main assembly 150 and away from coupling 134. Motor 142 and/or drive bush 144 may be positioned substantially near track 146 to permit drive bush 144 to contact or otherwise engage with track 146. In operation, motor 142 may cause drive bush 144 to rotate against track 146 and thus cause main assembly 150 to rotate relative to base 114 using ball bearings 140. As a result, patch antenna 130 may rotate with the rest of main assembly 150 to transmit radar signals 105 and detect return signals 108 over a 360 degree range of rotation.

Slip rings 136 may receive electrical power from a power source (e.g., a battery, generator, engine, or other power source) external to radar unit 110, and pass the electrical power to various electrically powered components of main assembly 150. As a result, main assembly 150 may be powered while it rotates relative to base 114. In another embodiment, radar unit 110 may include a rechargeable power source (e.g., a battery provided on or connected to power PCB 128 in one embodiment) to permit a user to charge up radar unit 110 before or after installation on a watercraft or other location. Other power sources may be used in other embodiments.

Main support 148 may be used to provide a physical mounting structure for the various components of main assembly 150. For example, radar flare 116, patch antenna 130, and low noise converter PCB 132 may be mounted to front plate 118 which may be mounted to main support 148.

Patch antenna 130 may transmit radar signals 105 and receive return signals 108. Radar flare 116 may direct the transmitted radar signals 105 and the received return signals 108. Heatsink 120 may dissipate heat generated by radar unit 110.

Power PCB 128 may be used to provide various components for amplifying radar signals 105 and for distributing power to radar unit 110. For example, in one embodiment, power PCB 128 may receive electrical power through slip rings 136. In another embodiment, power PCB 128 may include a power source, such as a rechargeable battery or other power source.

Receiver PCB 122 and low noise converter PCB 132 may provide various components to amplify and/or convert return signals 108 for use by radar unit 110.

In one embodiment, the various components of radar unit 110 may be implemented in a non-hermetically sealed arrangement. Receiver cover 124 and power cover 126 may be used to protect receiver PCB 128 and power PCB 128, respectively, from environmental conditions.

Wireless interface 125 may be used to communicate with communication interface 101 through wireless signals 109 to provide, for example, radar data to base station 111 corresponding to return signals 108 as discussed. Advantageously, the use of wireless interface 125 may permit radar unit 110 to be implemented without a complicated rotary joint (e.g., without one or more waveguides or data communication cables such as Ethernet cables or other cables connected to base station 111). For example, in one embodiment, radar unit 110 may not receive any wired or waveguided signal communications, and may only receive electrical power through slip rings 136. In another embodiment, radar unit 110 may include a power source and may receive no external electrical power, and no wired or waveguided signal communications.

In some embodiments, any type of transmission interface such as a wired interface (e.g., Ethernet and/or others) a wireless interface, and/or combinations of wired and wireless interfaces may be used in place of or in addition to perform the various operations of wireless interface 125.

Circulator 127 may be used to selectively direct radar signals 105 and return signals 108 to or from patch antenna 130. In one embodiment, circulator 127 may be a surface mount circulator configured to be mounted on a rear side of radar unit 110. Other types of circulators may be used in other embodiments.

Figure 9A:
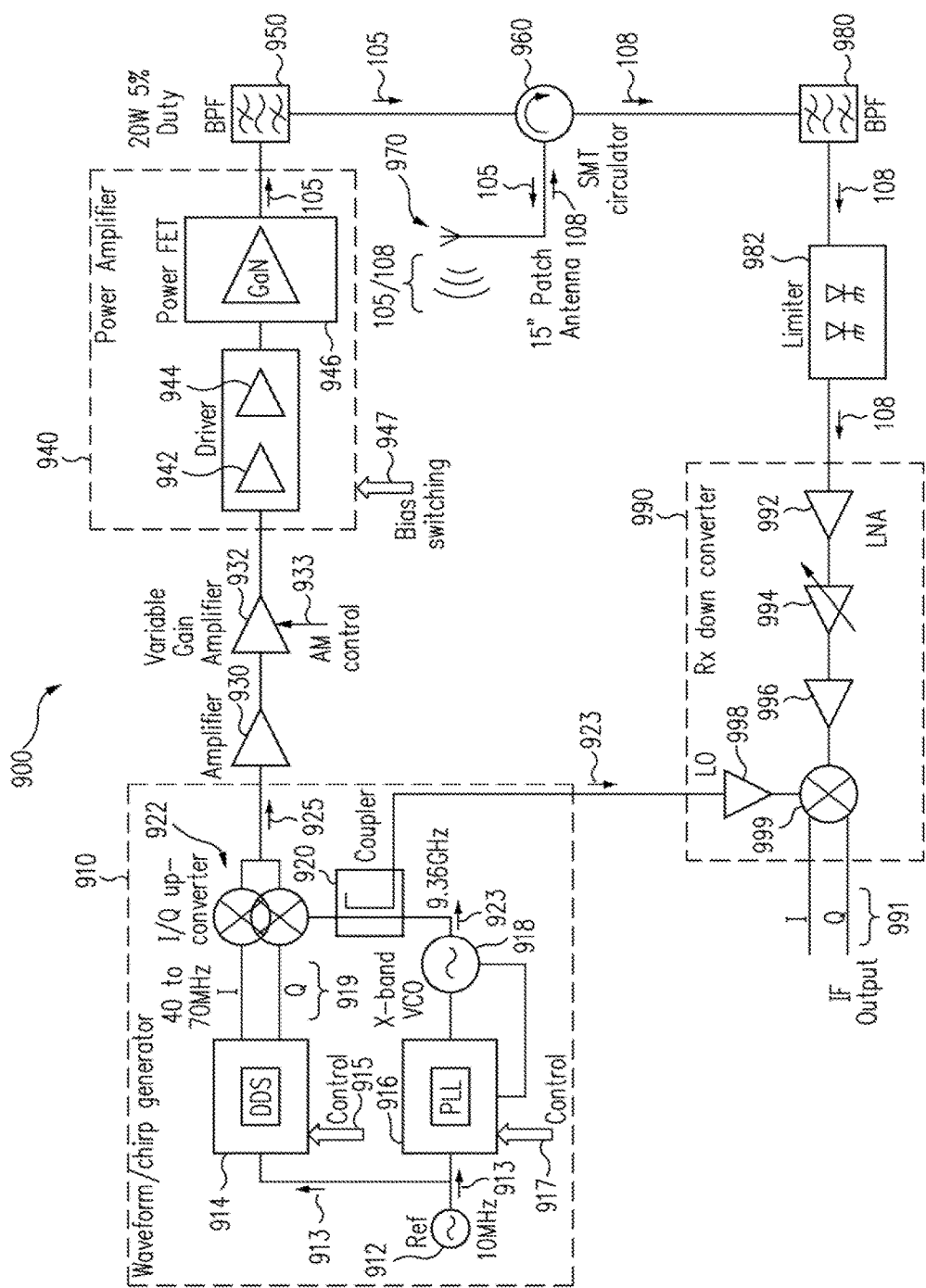
FIG. 9A illustrates a block diagram of a radar unit in accordance with an embodiment of the disclosure.

FIG. 9A illustrates a block diagram 900 of radar unit 110 in accordance with an embodiment of the disclosure. Block diagram 900 identifies components that may be used to provide various features of radar unit 110 in one embodiment. The various components identified in block diagram 900 may be implemented by any of the circuit boards or other components of radar unit 110 identified in FIGS. 2-8 and 10.

Block diagram 900 includes a waveform generator 910, amplifiers 930, 932, and 940, a band pass filter 950, a circulator 960, an antenna 970, a band pass filter 980, a limiter 982, and a downconverter 990. Various control signals 915, 917, 933, and 947 may be provided by one or more control units to adjust the operation of various components of radar unit 110. In one embodiment, base station 110, or another device in communication with base station 111 or radar unit 110, may operate as such a control unit (e.g., one or more control signals may be generated by base station 111 and provided to radar unit 110 through wireless signals 109 or appropriate wired communications). In another embodiment, appropriate components of radar unit 110 may operate as such a control unit.

Waveform generator 910 provides various waveforms, such as pulses of various lengths (e.g., different pulse widths), and FMCW signals, which may be implemented in radar signals 105. For example, long and short pulse waveforms may be generated for long range target detection. As another example, FMCW signals (e.g., linear frequency varying signals also referred to as chirp signals) may be generated for short range target detection. Such FMCW signals may be implemented, for example, as rising, falling, or rising/falling frequency sweeps (e.g., upchirps, downchirps, or up/down chirps). Other types of pulses, FMCW signals, and other waveforms may be used in other embodiments.

Waveform generator 910 includes a reference signal generator 912, a direct digital synthesizer (DDS) 914, a phase locked loop (PLL) circuit 916, an oscillator 918, a coupler 920, and an upconverter 922. Reference signal generator 912 (e.g., a crystal oscillator in one embodiment) generates a reference signal 913 (e.g., a 10 MHz reference signal in one embodiment) that is provided to DDS 914 and PLL circuit 916.

DDS 914 provides a baseband signal 919 (e.g., in the form of I and Q signals in one embodiment). In one embodiment, baseband signal 919 may have a nominal frequency of 40 MHz with an additional frequency deviation of up to 32 MHz (e.g., to provide a frequency range from 40 MHz to 72 MHz). In one embodiment, the frequency deviation and pulse length of baseband signal 919 may be varied with a range setting of radar unit 110 in response to control signal 915 (e.g., such that when radar unit 110 is set to the minimum range, radar signals 105 are no more than 5 percent of a displayed range scale when transmitted). In one embodiment, DDS 914 may be implemented by a FPGA and digital to analog converters (DACs). DDS 914 is clocked by reference signal 913 to maintain phase coherence between multiple radar pulses provided by radar signals 105.

PLL circuit 916 operates with oscillator 918 (e.g., running at 9.36 GHz in one embodiment) to provide a local oscillator (LO) signal 923 (e.g., a microwave X-band signal such as a 9.36 GHz signal in one embodiment) based on reference signal 913 and control signal 917. LO signal 923 is received by upconverter 922 through coupler 920.

Upconverter 922 translates baseband signal 919 to the X-band frequency range to provide an upconverted signal 925. In one embodiment, upconverted signal 925 may be an X-band signal within the maritime radar microwave signal range of 9.3 GHz to 9.5 GHz. In one embodiment, upconverter 922 may be implemented as an I/Q upconverter (e.g., a single sideband mixer) to comply with International Telecommunication Union (ITU) spectrum emission standards, or other standards. In one embodiment, the use of I and Q signals for baseband signal 919 may suppress an undesired sideband by up to 50 dB. In one embodiment, upconverted signal 925 may have a frequency range of 9.36 GHz to 9.4 GHz (e.g., corresponding to the 9.36 GHz frequency of the LO signal 923 swept by the 32 MHz frequency deviation of baseband signal 919).

Upconverted signal 925 is amplified by amplifiers 930, 932, and 940 to provide radar signal 105. In one embodiment, amplifier 930 may be a fixed gain amplifier.

In one embodiment, amplifier 932 may be a variable gain amplifier (e.g., having approximately 30 dB of wideband gain in one embodiment) that may be rapidly adjusted in response to one or more control signals 933 (e.g., amplitude modulation (AM) signals in one embodiment) to define and control the rise and fall times of transmitted radar pulses (e.g., corresponding to the waveforms provided by waveform generator 910) to reduce range side lobes (e.g., associated with pulse compression techniques) and to limit the transmitted spectrum profile to comply with ITU spectrum emission standards, or other standards. In one embodiment, the gain control provided by amplifier 932 may be augmented or replaced by an FPGA of waveform generator 910 controlling the output of DDS 914.

In one embodiment, amplifier 940 may include one or more drivers 942, 944, and 946 which may be implemented by one or more GaN field effect transistors (FETs) in one or more stages to provide compact and efficient amplification based on one or more control signals 947 (e.g., bias switching signals in one embodiment). Accordingly, amplifier 940 may also be referred to as a power amplifier. In one embodiment, amplifier 940 may be implemented as a two or three stage GaN device on a ceramic substrate with a matching circuit. In one embodiment, amplifier 940 may be implemented using multiple integrated circuits (e.g., a multiple chip module) using a GaN high electron mobility transistor (HEMT) die with GaN and/or GaAs drivers. In one embodiment, amplifier 940 may be matched to 50 Ohms nominally at its input and output.

In one embodiment, by implementing amplifier 940 as a solid state GaN device, radar system 100 may exhibit increased manufacturing yields, increased lifespan, decreased warm up times, increased power efficiency (e.g., greater than 35 percent per stage), reduced size and weight (e.g., more than 100 times lighter in one embodiment), reduced peak power, reduced power consumption, reduced spurious radio frequency (RF) emissions, and reduced cost in comparison with conventional magnetron-based systems. As discussed, GaAs and other amplifier implementations are also contemplated.

In one embodiment, amplifier 940 operates over the marine radar transmission band of 9.3 GHz to 9.5 GHz, with a nominal peak output of 20 Watts or greater and over 20 dB of gain from an input level of +15 dBm. In one embodiment, radar unit 110 may include additional filters (e.g., as part of or separate from amplifier 940) to filter undesired signals and harmonics (e.g., second and third harmonics of amplifier 940).

In one embodiment, amplifier 940 operates at a low duty cycle (e.g., less than 5 percent or less than 10 percent in various embodiments), rather than a continuous wave implementation. By using a low duty cycle, amplifier 940 may exhibit reduced average power dissipation, may be packaged at low cost, and may exhibit improved thermal efficiency over other systems (e.g., approximately a 10 times improvement over some magnetron-based systems and approximately a 2 times improvement over some Gallium Arsenide (GaAs) based systems in various embodiments).

In one embodiment, drain and gate bias current for each stage of amplifier 940 may be switched in response to control signals 947 and in sympathy with (e.g., in relation to or synchronous with to some extent) the waveforms provided by waveform generator 910 such that amplifier 940 is off (e.g., exhibits minimum gain and maximum isolation) when no waveforms for radar signals 105 are desired to be transmitted (e.g., to prevent carrier signal leakage from overloading receive components of radar unit 110 when no desired signal is present).

Band pass filter 950 filters radar signal 105 to attenuate any unwanted frequencies outside the designated marine radar transmit band. In one embodiment, band pass filter 950 may be implemented as a micro-strip coupled filter. Circulator 960 (e.g., which may be used to implement circulator 127 in one embodiment) selectively directs radar signals 105 and return signals 108 to or from antenna 970 (e.g., which may be used to implement patch antenna 130 in one embodiment). Band pass filter 980 filters return signals 108 to attenuate any unwanted frequencies outside the designated marine radar transmit band.

In one embodiment, amplifier 940, circulator 960, and various other components of radar system 110 may be implemented as low power surface mount components (e.g., with connection terminals co-planar to the underside of the components to permit automated assembly, rather than using a drop-in package style, flange mounting, or chips with wire bonding). In this regard, the underside of such components may provide ground and heat sink surfaces suitable for solder attachment to one or more PCBs and to dissipate heat to such PCBs.

Limiter 982 limits the amplitude of return signals 108. For example, limiter 982 may prevent radar signals 105 from overloading downstream circuitry in the event that radar signals 105 (e.g., having a much greater amplitude than return signals 108) are inadvertently detected by antenna 970 (e.g., resulting from leakage occurring during transmission of radar signals 105). Limiter 982 may also prevent similar overloading from other signals such as, for example, other conventional pulse radar signals that may be in the vicinity of radar unit 110. In one embodiment, limiter 982 may be implemented using one or more diodes.

Downconverter 990 converts return signals 108 to I and Q signals 991 (e.g., also referred to as data signals) at intermediate frequencies (IF) for further processing. Downcoverter includes amplifiers 992, 994, and 996, a buffer 998, and a mixer 999. In one embodiment, amplifiers 992 and 996 may be fixed gain amplifiers, and amplifier 994 may be a variable gain amplifier.

Amplifiers 992, 994, and 996 amplify return signals 108, and buffer 998 receives LO signal 923 from coupler 920. Mixer 999 operates on return signals 108 and LO signal 923 to downconvert return signals 108 to provide I and Q signals 991 in the range of 40 MHz to 72 MHz.

By using LO signal 923 in upconverter 922 and downconverter 990, they may be synchronized and maintain phase coherence with each other. In one embodiment, such phase coherence improves the processing gain and signal to noise ratio that may be achieved in digital signal processing of I and Q signals 991.

In one embodiment, non-zero frequencies may be used for I and Q signals 991 to eliminate DC offset problems while also allowing I and Q signals 991 to be sampled at relatively low frequencies by appropriate analog to digital converters (ADCs) (not shown) which may be provided after the output of downconverter 990. In this regard, I and Q signals 991 may be sampled and further processed by appropriate components of radar unit 110 or base station 111. In one embodiment, I and Q signals 991 (e.g., or one or more signals derived or sampled therefrom) may be transmitted from wireless interface 125 of radar unit 110 to communication interface 101 of base station 111 through wireless signals 109.

In FIG. 9A, PLL circuit 916 and oscillator 918 feed upconverter 922 via coupler 920. In some embodiments, such an arrangement may rely on DSS 914 to provide pulse waveforms and FMCW waveforms, and may rely on PLL circuit 916 and oscillator 918 to provide LO signal 923 used by upconverter 922 to upconvert the waveforms provided by DSS 914.

Figure 9B:
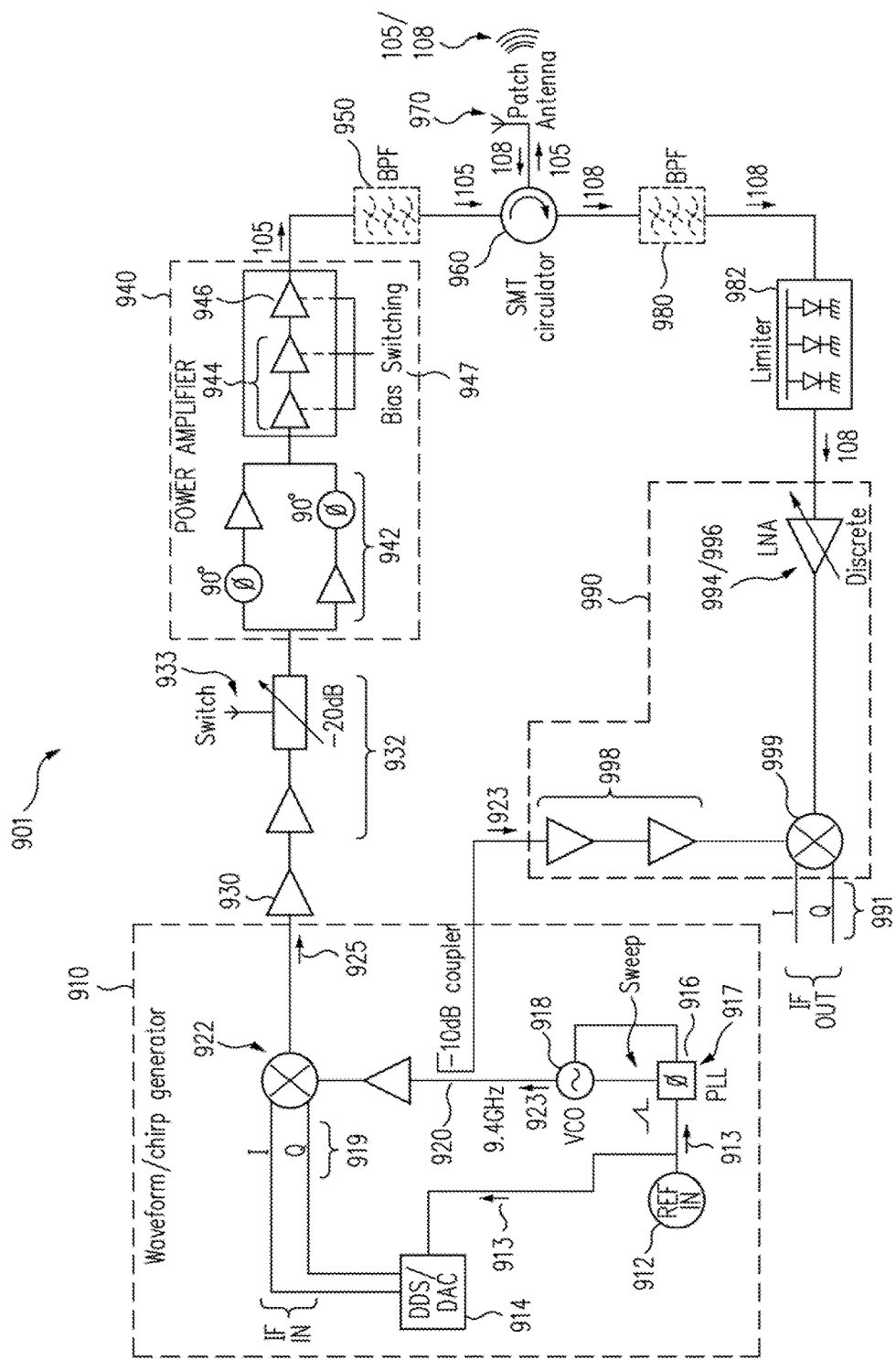
FIG. 9B illustrates another block diagram of a radar unit in accordance with an embodiment of the disclosure.

FIG. 9B illustrates another block diagram 901 of radar unit 110 in accordance with an embodiment of the disclosure. As shown, various components illustrated in block diagram 901 may be implemented in the same, similar, and/or different manner as illustrated in block diagram 900 of FIG. 9A. In some embodiments, waveform generator 910 may be implemented with additional features in FIG. 9B.

In some embodiments, DSS 914 may be used to provide pulse waveforms in baseband signal 919 that are upconverted to signal 922 (e.g., during a pulse operation mode), and PLL circuit 916 and oscillator 918 may be used to provide FMCW waveforms in LO signal 923 (e.g., by sweeping the frequency of LO signal 923 based on changes in control signal 917) that are upconverted to signal 922 (e.g., during an FMCW operation mode). In such embodiments, the different types of waveforms may be independently provided by DDS 914 and PLL circuit/oscillator 916/918.

In some embodiments, during a pulse operation mode, DSS 914 may provide pulse waveforms in baseband signal 919, and PLL circuit/oscillator 916/918 may provide a substantially fixed frequency for LO signal 923.

In some embodiments, during an FMCW operation mode, DSS 914 may be used simultaneously with PLL circuit 916 and oscillator 918 to provide FMCW waveforms in upconverted signal 925. For example, DSS 914 may provide a substantially fixed frequency (e.g., approximately 32 MHz in one embodiment) for baseband signal 919, and PLL circuit/oscillator 916/918 may sweep the frequency of LO signal 923. As a result, upconverted signal 925 may exhibit an FMCW waveform (e.g. associated with the sweep of LO signal 919). As shown, mixer 999 of downconverter 990 receives LO signal 923 which may be used to downconvert reflected return signals 108 to I and Q signals 991 (e.g., intermediate frequency signals). Accordingly, in some embodiments, I and Q signals 991 may be centered around the substantially fixed frequency provided by DSS 914 (e.g., approximately 32 MHz in one embodiment).

In some embodiments, such an approach may reduce receiver-side flicker noise over other approaches where I and Q signals 991 may be centered substantially around 0 MHz. In some embodiments, such an approach may also reduce the frequency span, and thus the sample rate used for I and Q signals 919 and/or 991 in comparison with other approaches in which FMCW signals are provided only by a modulated baseband signal 919 from DSS 914. In some embodiments, such an approach may also permit baseband signal 919 to be generated from DDS 914, directly from a DAC (e.g., as identified in FIG. 9B), and/or any other appropriate type of baseband signal generator.

Figure 10:
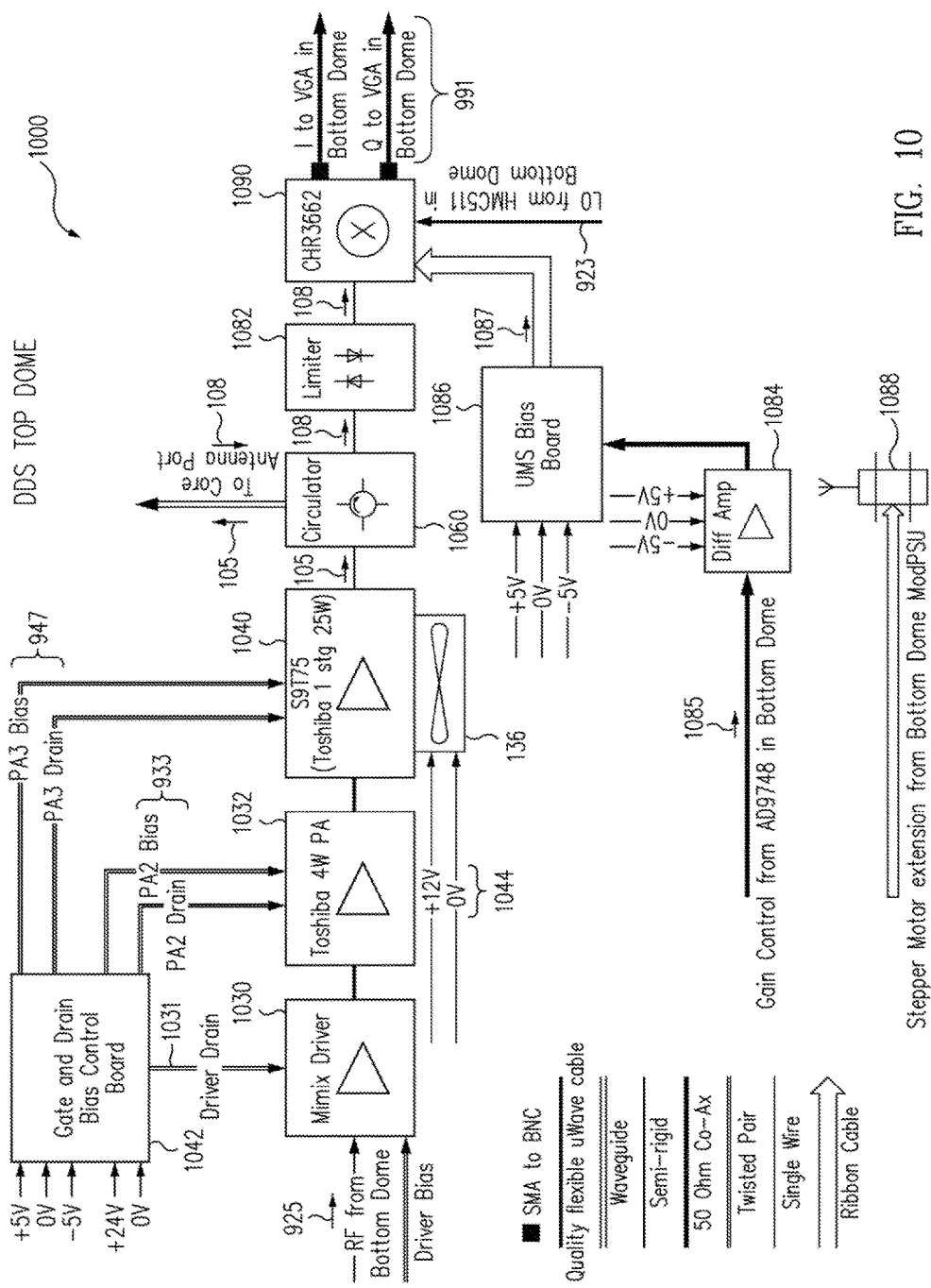
FIG. 10 illustrates yet another block diagram of a radar unit in accordance with an embodiment of the disclosure.

FIG. 10 illustrates yet another block diagram 1000 of radar unit 110 in accordance with an embodiment of the disclosure. Block diagram 1000 identifies components that may be used to provide various features of radar unit 110 in one embodiment. The various components identified in block diagram 1000 may be implemented by any of the circuit boards or other components of radar unit 110 identified in FIGS. 2-9B.

Block diagram 1000 includes amplifiers 1030, 1032, and 1040, a bias board 1042, a circulator 1060, a limiter 1082, an amplifier 1084, a bias board 1086, a motor 1088, and a downconverter 1090.

Amplifiers 1030, 1032, and 1040 may be used to implement amplifiers 930, 932, and 940, respectively, of FIG. 9A. In one embodiment, amplifier 1030 receives upconverted signal 925 (e.g., from waveform generator 910 of FIG. 9A), and amplifier 1040 provides radar signals 105 to circulator 1060 (e.g., in one embodiment, radar signals 105 may be further filtered as identified in FIG. 9A).

Bias control board 1042 may operate as a control unit to provide control signals 1031, 933, and 947 to amplifiers 1030, 1032, and 1040. Power signals 1044 (e.g., provided by an appropriate power source internal or external to radar unit 110) supply electrical power to amplifier 1040 and/or other components of radar unit 110 through slip rings 136. Motor 1088 may be used to implement motor 142 in one embodiment.

Circulator 1060, limiter 1082, and downconverter 1090 may be used to implement circulator 960, limiter 982, and downconverter 990, respectively, of FIG. 9A. In one embodiment, circulator 1060 receives return signals 108 from an antenna (e.g., patch antenna 130 or antenna 970 in various embodiments) and passes return signals 108 to limiter 1082. In one embodiment, return signals 108 may be further filtered as identified in FIG. 9A. Limiter 1082 provides return signals 108 to downconverter 1090.

Downconverter 1090 provides I and Q signals 991. Downconverter 1090 receives LO signal 923 as discussed with regard to FIG. 9A. Amplifier 1084 and bias board 1086 control the operation of downconverter 1090 through a bias signal 1087 in response to a gain control signal 1085.

Figure 13:
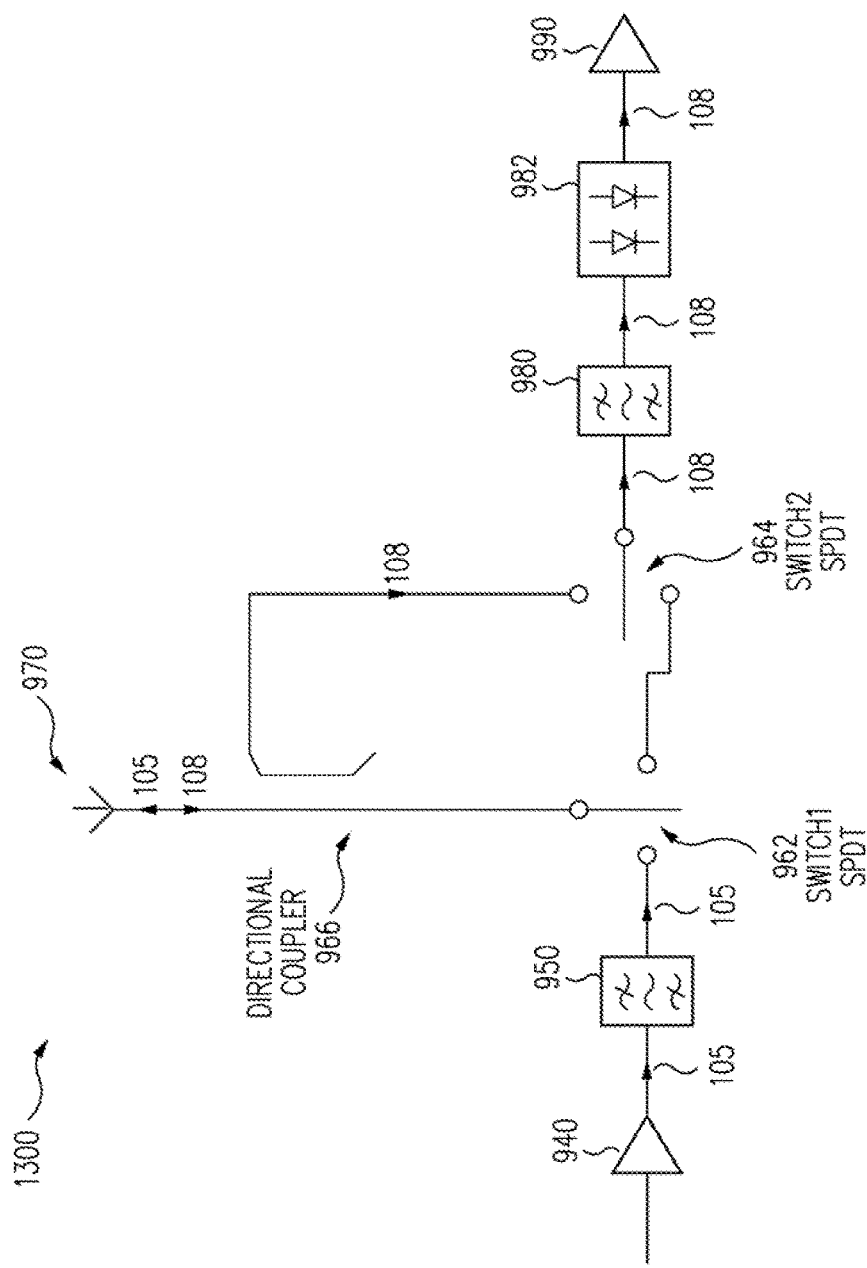
FIG. 13 illustrates a further block diagram of a radar unit in accordance with an embodiment of the disclosure.

FIG. 13 illustrates a further block diagram 1300 of radar unit 110 in accordance with an embodiment of the disclosure. In block diagram 1300, circulators 127/960/1060 have been replaced by single pole double throw (SPDT) switches 962/964 (e.g., transmit/receive switches) and a directional coupler 966. Switches 962/964 may be operated by actuators or other appropriate mechanisms as desired. In various embodiments, a configuration using switches 962/964 and directional coupler 966 may provide improved performance and/or reduced cost over circulator-based implementations and still be compatible with pulse compression and FMCW signaling techniques. Switches 962/964 and directional coupler 966 may be used in place of or in addition to circulators 127/960/1060 in various embodiments. Accordingly, any desired type of signal directing device (e.g., any combination of circulators 127/960/1060, switches 962/964, directional coupler 966, and/or other appropriate components) may be used as desired in particular implementations.

Figure 11:
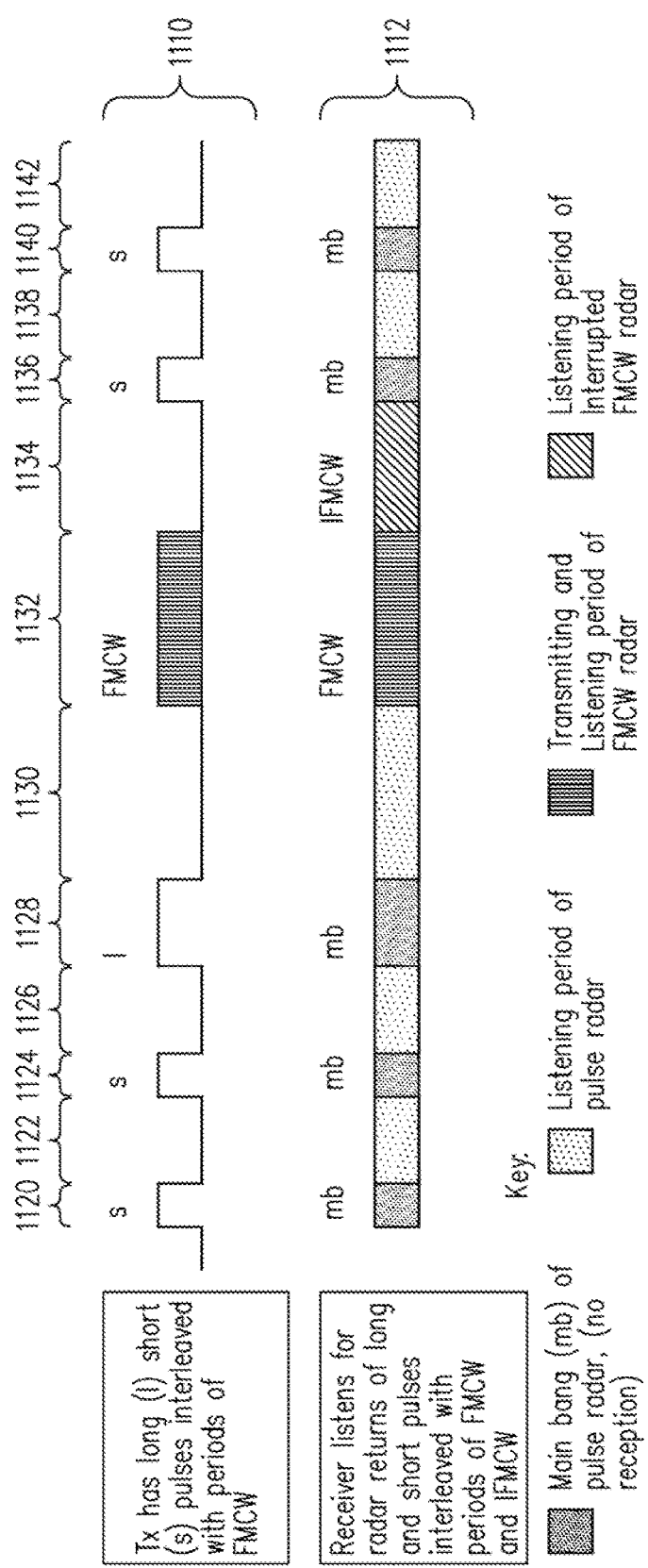
FIG. 11 illustrates timing diagrams of a radar unit in accordance with an embodiment of the disclosure.

FIG. 11 illustrates timing diagrams 1110 and 1112 of radar unit 110 in accordance with an embodiment of the disclosure. As discussed, waveform generator 910 provides various waveforms, such as pulses of various lengths and FMCW waveforms, which may be implemented in radar signals 105.

Timing diagram 1110 illustrates an example of a transmission sequence in which radar signals 105 are transmitted over time periods 1120 to 1142 with various types of waveforms. Timing diagram 1112 illustrates an example of a detection (e.g., listening) sequence in which radar unit 110 may detect return signals 108 in response to the transmission sequence of timing diagram 1110.

During time periods 1120, 1124, 1136, and 1140, radar signals 105 are transmitted with short pulse (s) waveforms. During time period 1128, radar signals 105 are transmitted with long pulse (l) waveforms.

Time periods 1120, 1124, 1128, 1136, and 1140 are also referred to as main bang (mb) periods and transmission periods. During the main bang periods, radar unit 110 may transmit high amplitude pulsed radar signals 105 (e.g., having short or long pulses) which are effective for detection of long range targets. However, during transmission, the high amplitude pulsed radar signals 105 may obscure the reception of any return signals 108. Accordingly, during the main bang periods (e.g., and shortly thereafter in one embodiment), radar unit 110 may not detect any return signals 108.

Following time periods 1120, 1124, 1128, 1136, and 1140, radar unit 110 enters corresponding detection periods 1122, 1126, 1130, 1138, and 1142 in which return signals 108 are detected in response to the various transmitted short and long pulse waveforms.

During time period 1132, radar signals 105 with FMCW waveforms are repeatedly transmitted and corresponding return signals 108 are detected. In one embodiment, the FMCW waveform radar signals 105 may be broadcast with a lower amplitude than the pulsed waveforms provided during other time periods. Such FMCW signaling techniques are effective for detection of short range targets. In one embodiment, radar unit 110 may rapidly switch between FMCW transmission and reception during time period 1132 to provide a series of short transmission and detection periods within time period 1132.

Following time period 1132, radar unit 110 enters time period 1134 (e.g., an interrupted FMCW detection period) during which radar unit 110 refrains from transmitting further radar signals 105 but continues to detect return signals 108 in response to previously transmitted low amplitude FMCW radar signals 105.

As shown in FIG. 11, the different short pulse, long pulse, and FMCW waveforms may be interleaved with each other over time and may repeat (e.g., the illustrated sequence of short pulse waveform, short pulse waveform, long pulse waveform, and FMCW waveform may repeat beginning with the short pulse waveforms shown on the right side of timing diagram 1110). Other transmission period sequences may be used in other embodiments.

By transmitting various pulsed and FMCW radar signals 105, and by detecting the resulting return signals 108, radar unit 110 may be used to perform both long range target detection (e.g., detection of large targets such as land masses, large cruising ships, or other targets at a range of up to approximately 12 nautical miles or more in one embodiment) and short range target detection (e.g., high resolution detection at a range of up to approximately 6 nautical miles or more in one embodiment). Moreover, such detection may be performed with lower peak power use in comparison with conventional pulsed signal radar systems.

The various return signals 108 may be processed and/or combined (e.g., by processor 102 in one embodiment) in accordance with pulse compression techniques, Doppler processing techniques, and/or other techniques, to provide one or more composite images or target buffers. In one embodiment, the interleaving of different short pulse, long pulse, and FMCW radar signals 105 permits return signals 108 to be correlated to particular transmitted radar signals 105, permits Doppler signals to be effectively identified, and permits resolution of range velocity ambiguities associated with detected targets.

Although particular examples of transmission and detection period sequences and waveforms are shown in FIG. 11, other transmission and detection period sequences and waveforms may be used in other embodiments. Moreover, the pulse repetition frequency (PRF) and pulse repetition interval (PRI) associated with the various time periods identified in FIG. 11 may be adjusted as desired for particular implementations.

Figure 12:
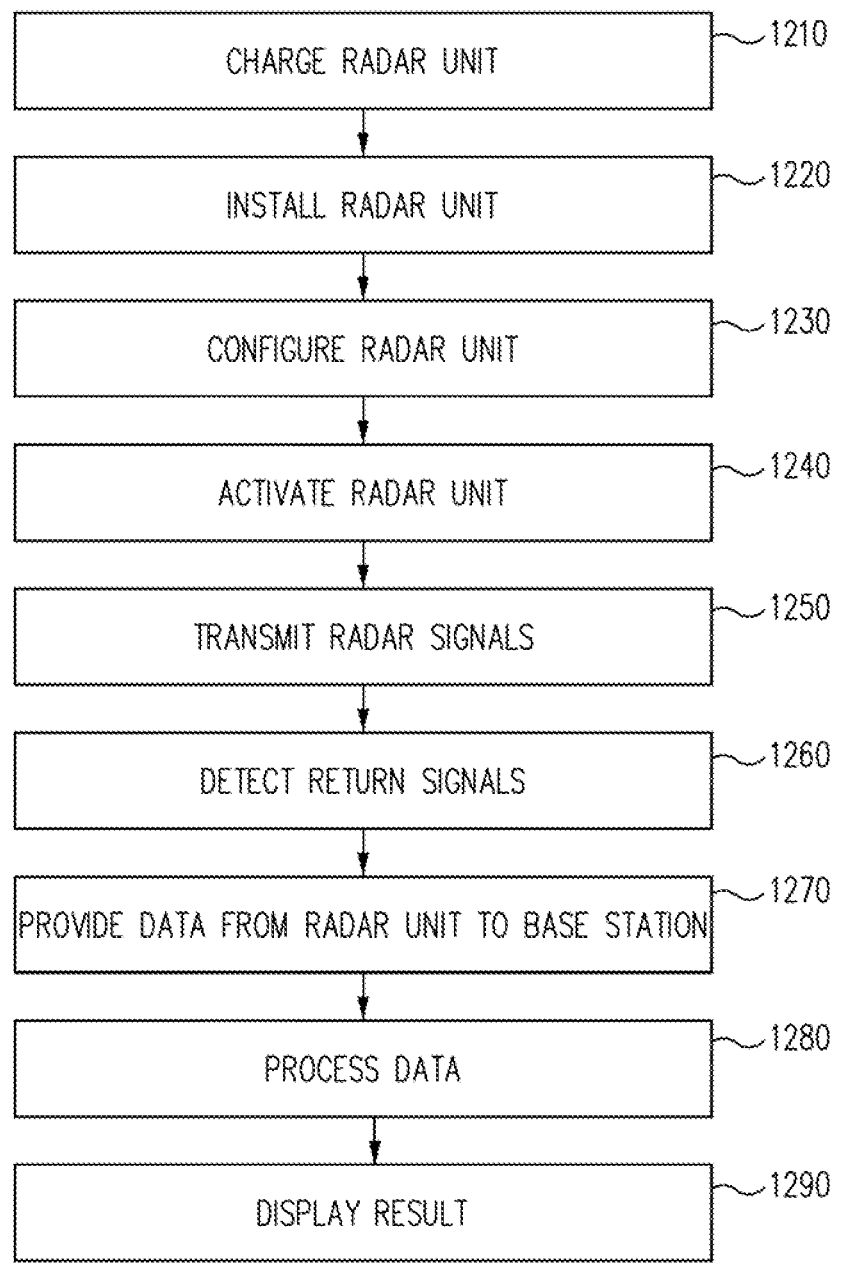
FIG. 12 illustrates a process of operating a radar system in accordance with an embodiment of the disclosure.

FIG. 12 illustrates a process of operating radar system 100 in accordance with an embodiment of the disclosure. Although various blocks of FIG. 12 are primarily described as being performed by either radar unit 110 or base station 111, other embodiments are also contemplated wherein the various blocks may be performed by any desired combination of radar unit 110, base station 111, and/or other components.

In block 1210, in an embodiment where radar unit 110 is battery powered and detachable from its installation location, radar unit 110 may be charged. For example, if radar unit 110 is equipped with a rechargeable power source, such as a rechargeable battery, then radar unit 110 may be charged before use. In another embodiment, radar unit 110 need not be charged and block 1210 may be omitted.

In block 1220, radar unit 110 is installed for operation. For example, in one embodiment, radar unit 110 may be a portable unit that may be installed on watercraft, aircraft, vehicles, or fixed locations. In an embodiment where radar unit 110 receives electrical power from an external power source, then block 1220 may include connecting the power source to radar unit 110 to provide electrical power through slip rings 136.

In block 1230, radar unit 110 may be configured for operation. Such configuration may include, for example, setting one or more range parameters or other operational parameters of radar unit 110. In one embodiment, such configuration may be performed by manipulating one or more physical controls on radar unit 110. In another embodiment, such configuration may be performed by a user interacting with base station 111 which sends configuration information to radar unit 110 through wireless signals 109.

In block 1240, radar unit 110 is activated for operation. As a result, in block 1250, radar unit 110 generates and transmits radar signals 105. In one embodiment, radar signals 105 may be transmitted in accordance with various pulsed and FMCW waveforms described herein. Other types of radar signals 105 and other waveforms may be used in other embodiments.

In block 1260, radar unit 110 detects return signals 108. In one embodiment, return signals 108 may be detected in accordance with various pulsed and FMCW detection periods described herein. Other types of return signals 108 and other detection periods may be used in other embodiments.

In block 1270, radar unit 110 provides radar data based on return signals 108 to base station 111. In one embodiment, such data may be sampled I and Q signals 991 that are transmitted from wireless interface 125 of radar unit 110 to communication interface 101 of base station 111 through wireless signals 109. In another embodiment, such radar data may be other signals provided by wireless or wired communication between radar unit 110 and base station 111.

In block 1280, the data provided in block 1270 is processed by any desired combination of radar unit 110, base station 111, and/or other components. In one embodiment, such processing may include, for example, pulse compression processing, Doppler processing, MARPA processing, and/or other processing techniques to generate result information in the form of images, text, and/or other forms. In one embodiment, by performing Doppler processing, radar system 100 may determine the velocity of detected targets to provide situational awareness for the user. In one embodiment, radar system 100 may be configured to provide MARPA features to permit accurate and reliable identification and tracking of detected targets (e.g., using velocity vectors in one embodiment), sea clutter recognition, and sea clutter suppression. Such MARPA features may be enhanced to perform automatic target acquisition.

In block 1290, the generated result information is displayed to the user. In one embodiment, the result information is provided on display 106 of base station 111. For example, in one embodiment, moving targets may be displayed in different colors to depict closing or retreating targets.

In view of the present disclosure, it will be appreciated that a radar system 100 implemented in accordance with the various embodiments identified herein may provide various advantages over conventional radar systems. For example, the use of a solid state GaN amplifier in place of a magnetron permits radar system 100 to be implemented with a compact form factor and relatively low power draw. As another example, the use of wireless interface 125 permits radar system 100 to be implemented without a complicated rotary joint to pass return signals 108. As another example, the use of both pulsed and FMCW signaling permits radar system 100 to perform both short range and long range detection using a single radar system. As another example, radar system 100 may perform Doppler processing on return signals 108 to provide accurate and reliable vessel target tracking, sea clutter recognition, and assistance in target identification.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
    a waveform generator adapted to provide pulse waveforms of different pulse widths and Frequency Modulated Continuous Wave (FMCW) waveforms;
    wherein the waveforms are interleaved with each other to provide a predetermined repeating transmission sequence for radar signals broadcast for detection of long range and short range targets;
    wherein the predetermined repeating transmission sequence comprises a first pulse transmission period for transmission of one of the pulse waveforms of a first length, a second pulse transmission period for transmission of one of the pulse waveforms of a second length, and a plurality of FMCW transmission periods for transmission of the FMCW waveforms; and
    a transmission interface adapted to transmit radar data based on return signals received in response to the radar signals in accordance with a detection sequence comprising a first pulse detection period, a second pulse detection period, and a plurality of FMCW detection periods interleaved with the FMCW transmission periods.

2. The system of claim 1, further comprising a radar unit comprising the waveform generator and the transmission interface, wherein the transmission interface is a wireless interface adapted to transmit the radar data as wireless signals to a base station.

3. The system of claim 2, further comprising the base station.

4. The system of claim 2, wherein the base station is a personal electronic device.

5. The system of claim 2, wherein the radar unit is adapted to be located on a watercraft.

6. The system of claim 1, further comprising a Gallium Nitride (GaN) solid state power amplifier adapted to amplify the radar signals for broadcast.

7. The system of claim 1, further comprising a variable gain amplifier adapted to:
   adjust the rise and fall times of the waveforms in response to a first control signal to reduce side lobes and limit a transmitted spectrum profile of the radar signals; and
   turn off in response to a second control signal to prevent signal leakage from overloading other circuitry of the system when the radar signals are not desired to be transmitted.

8. The system of claim 1, further comprising a processor adapted to perform Doppler processing based on the return signals to detect moving targets.

9. The system of claim 1, further comprising a rechargeable battery adapted to power the system.

10. The system of claim 1, wherein:
    the waveform generator comprises:
       a phase locked loop (PLL) circuit and an oscillator adapted to provide the FMCW waveforms,
       a baseband signal generator adapted to provide the pulse waveforms, and
       an upconverter adapted to convert the FMCW waveforms and the pulse waveforms from baseband signals to the radar signals;
    the system further comprises a downconverter adapted to generate data signals based on the return signals; and
    the upconverter and the downconverter are synchronized by a shared local oscillator signal to maintain phase coherence between the upconverter and the downconverter.

11. A method comprising:
    providing pulse waveforms of different pulse widths and Frequency Modulated Continuous Wave (FMCW) waveforms;
    wherein the waveforms are interleaved with each other to provide a predetermined repeating transmission sequence for radar signals broadcast for detection of long range and short range targets;
    wherein the predetermined repeating transmission sequence comprises a first pulse transmission period for transmission of one of the pulse waveforms of a first length, a second pulse transmission period for transmission of one of the pulse waveforms of a second length, and a plurality of FMCW transmission periods for transmission of the FMCW waveforms; and
    transmitting radar data based on return signals received in response to the radar signals in accordance with a detection sequence comprising a first pulse detection period, a second pulse detection period, and a plurality of FMCW detection periods interleaved with the FMCW transmission periods.

12. The method of claim 11, wherein:
    the providing is performed by a waveform generator of a radar unit;
    the transmitting is performed by a wireless transmission interface of the radar unit; and
    the transmitting comprises transmitting the radar data as wireless signals to a base station.

13. The method of claim 12, further comprising receiving the radar data at the base station.

14. The method of claim 12, wherein the base station is a personal electronic device.

15. The method of claim 12, wherein the radar unit is adapted to be located on a watercraft.

16. The method of claim 11, further comprising amplifying the radar signals by a Gallium Nitride (GaN) solid state power amplifier for broadcast.

17. The method of claim 11, further comprising a variable gain amplifier adapted to:
    adjusting, by a variable gain amplifier, the rise and fall times of the waveforms in response to a first control signal to reduce side lobes and limit a transmitted spectrum profile of the radar signals; and
    turning off the amplifier in response to a second control signal to prevent signal leakage from overloading circuitry when the radar signals are not desired to be transmitted.

18. The method of claim 11, further comprising performing Doppler processing based on the return signals to detect moving targets.

19. The method of claim 11, wherein the providing and the transmitting are performed by a radar system, the method further comprising powering radar system by a rechargeable battery.

20. The method of claim 11, wherein:
    the providing comprises:
       providing the FMCW waveforms using a phase locked loop (PLL) circuit and an oscillator, and
       providing the pulse waveforms using a baseband signal generator; and
    the method further comprises:
       converting the FMCW waveforms and the pulse waveforms from baseband signals to the radar signals using an upconverter,
       generating data signals based on the return signals using a downconverter, and
       synchronizing the upconverter and the downconverter by a shared local oscillator signal to maintain phase coherence between the upconverter and the downconverter.

* * * * *

UNITED STATES PATENT AND TRADEMARK OFFICE
CERTIFICATE OF CORRECTION

PATENT NO.         : 10,024,953 B2
APPLICATION NO.    : 15/482554
DATED              : July 17, 2018
INVENTOR(S)        : Stuart Johnson et al.

Page 1 of 1

It is certified that error appears in the above-identified patent and that said Letters Patent is hereby corrected as shown below:

In the Specification

In the Detailed Description:

In Column 4, Line 42, change "e.g., Bluetooth™" to --e.g., Wi-Fi™, Bluetooth™--.

In the Claims

In Claim 19, Column 16, Line 38, change "powering radar system" to --powering the radar system--.

Signed and Sealed this
Twenty-eighth Day of August, 2018

Andrei Iancu
*Director of the United States Patent and Trademark Office*